C. A. HANSEN.
CARBON ELECTRODE.
APPLICATION FILED JULY 23, 1909.
1,019,463.
Patented Mar. 5, 1912.
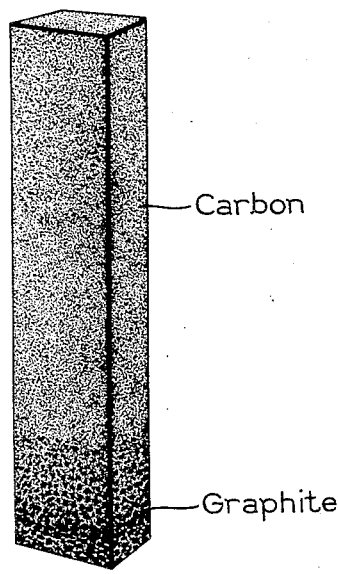
Witnesses:
Inventor:
Charles A. Hansen,
by
His Attorney.

UNITED STATES PATENT OFFICE.

CHARLES A. HANSEN, OF SCHENECTADY, NEW YORK, ASSIGNOR TO GENERAL ELECTRIC COMPANY, A CORPORATION OF NEW YORK.

CARBON ELECTRODE.

1,019,463. Specification of Letters Patent. Patented Mar. 5, 1912.

Application filed July 23, 1909. Serial No. 509,138.

*To all whom it may concern:*

Be it known that I, CHARLES A. HANSEN, a citizen of the United States, residing at Schenectady, in the county of Schenectady, State of New York, have invented certain new and useful Improvements in Carbon Electrodes, of which the following is a specification.

My invention relates to carbon electrodes particularly electric furnace electrodes, and it comprises a process whereby the life of electrodes is materially increased and their use extended, and it also comprises a novel electric furnace electrode which is the result of this process.

The accompanying drawing illustrates a furnace electrode prepared in accordance with my invention.

It has heretofore been impracticable to use what are commonly known as carbon electrodes as distinguished from graphite electrodes in electric furnace work, as the working end of the carbon electrode when subjected to the high temperature existing in the furnace would continually crack and sliver off, pieces of the electrode falling into the charge, and the electrode in this manner rapidly disintegrating. For this reason, it has been necessary to convert the carbon electrodes into graphite electrodes at considerable expense.

According to my invention, the carbon electrodes are prepared for use in electric furnace work by being graphitized at their tip, or working end. Carbon electrodes when thus prepared are entirely satisfactory for furnace work, possibly because the part of the carbon electrode in immediate proximity to the graphitized tip is converted into graphite when the electrodes are in use by being subjected to the high temperature near the working end, so that as the tip is consumed the adjacent zone of carbon is progressively graphitized, until the entire electrode has been consumed.

My invention may be carried out in any convenient way which will locally raise the tip of the electrode to the graphitizing temperature, say about 3000° C. For example, the electrodes are placed in contact end to end and the point of contact is covered with powdered coke. When a current is passed through the electrodes thus in contact the point of contact is raised to a high temperature because of its transition resistance. The coke serves to protect the heated carbon from oxidation. The heating is continued in this manner for about fifteen minutes, or until the temperature of graphitization has been attained throughout the region to be graphitized.

What I claim as new and desire to secure by Letters Patent of the United States, is:

1. As an article of manufacture, an electric furnace electrode having a body portion of carbon and a tip of graphite.

2. The method of graphitizing electrodes which consists in arranging them end to end with imperfect contact and passing a current through them so as to cause a greater graphitizing tendency at the contacting ends than at other parts of the electrodes.

In witness whereof, I have hereunto set my hand this 22nd day of July, 1909.

CHARLES A. HANSEN.

Witnesses:
BENJAMIN B. HULL,
HELEN ORFORD.